United States Patent
Kanamori

(10) Patent No.: US 10,706,641 B2
(45) Date of Patent: Jul. 7, 2020

(54) INFORMATION SUPPLY DEVICE, INFORMATION SUPPLY METHOD, AND STORAGE MEDIUM

(71) Applicant: HONDA MOTOR CO., LTD., Minato-ku, Tokyo (JP)

(72) Inventor: Iori Kanamori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/535,144

(22) Filed: Aug. 8, 2019

(65) Prior Publication Data
US 2020/0074756 A1    Mar. 5, 2020

(30) Foreign Application Priority Data

Sep. 5, 2018    (JP) .................................. 2018-165956

(51) Int. Cl.
| | |
|---|---|
| *B60L 58/12* | (2019.01) |
| *G07C 5/00* | (2006.01) |
| *G06F 3/14* | (2006.01) |
| *B60K 35/00* | (2006.01) |
| *B60L 58/24* | (2019.01) |

(52) U.S. Cl.
CPC .............. *G07C 5/004* (2013.01); *B60K 35/00* (2013.01); *B60L 58/12* (2019.02); *G06F 3/14* (2013.01); *B60L 58/24* (2019.02); *B60Y 2200/91* (2013.01); *B60Y 2200/92* (2013.01)

(58) Field of Classification Search
CPC ......... G07C 5/004; B60L 58/12; B60L 58/24; B60K 35/00; G06F 3/14; B60Y 2200/91; B60Y 2200/92
See application file for complete search history.

(56) References Cited

U.S. PATENT DOCUMENTS

| | | | | |
|---|---|---|---|---|
| 5,281,919 A | * | 1/1994 | Palanisanny | ......... G01R 31/007 324/427 |
| 5,434,495 A | * | 7/1995 | Toko | ................. G01R 19/16528 320/135 |
| 5,539,318 A | * | 7/1996 | Sasaki | .............. G01R 19/16542 324/428 |

(Continued)

OTHER PUBLICATIONS

Teslarati, "Testa Model S Cold Weather Battery Indicator Bar", retrieved on Sep. 4, 2018 <URL:https://forums.teslarati.com.com/threads/tesla-model-s-cold-weather-battery-indicator-bar_665/>.

*Primary Examiner* — Nay Tun
(74) *Attorney, Agent, or Firm* — Amin, Turocy & Watson, LLP

(57) ABSTRACT

A display device includes: a storage management unit storing a first temperature of a secondary cell measured at a first timing before driving stop of a vehicle in a storage unit in association with the first timing; a residual capacity change derivation unit deriving a residual capacity change of the secondary cell between the first timing and a second timing at which driving of the vehicle restarts based on a second temperature of the secondary cell measured at the second timing and the first temperature read from the storage unit; and a display control unit determining whether the display unit is caused to display a predetermined display based on the derived residual capacity change of the secondary cell and a temporary difference between the first timing and the second timing.

12 Claims, 6 Drawing Sheets

(56) References Cited

U.S. PATENT DOCUMENTS

| | | | | |
|---|---|---|---|---|
| 5,592,094 | A * | 1/1997 | Ichikawa | H01M 10/44 324/427 |
| 5,598,087 | A * | 1/1997 | Hara | G01R 31/3648 324/431 |
| 5,650,712 | A * | 7/1997 | Kawai | H01M 10/48 324/427 |
| 5,872,453 | A * | 2/1999 | Shimoyama | G01R 19/32 324/431 |
| 6,157,169 | A * | 12/2000 | Lee | G01R 19/16542 320/132 |
| 6,160,380 | A * | 12/2000 | Tsuji | G01R 31/3648 320/132 |
| 6,275,008 | B1 * | 8/2001 | Arai | G01R 31/3648 320/132 |
| 6,583,606 | B2 * | 6/2003 | Koike | H02J 7/0069 320/149 |
| 7,015,676 | B2 * | 3/2006 | Kohama | B60K 6/445 320/150 |
| 7,208,914 | B2 * | 4/2007 | Klang | G01R 31/3648 320/132 |
| 7,233,128 | B2 * | 6/2007 | Brost | G01R 31/3648 320/132 |
| 7,339,351 | B2 * | 3/2008 | Murakami | B60L 3/0046 320/132 |
| 7,406,389 | B2 * | 7/2008 | Emori | B60W 10/26 702/85 |
| 7,821,232 | B2 * | 10/2010 | Shun-Hsing | H01M 10/42 320/132 |
| 9,020,692 | B2 * | 4/2015 | Annano | G07C 5/0808 701/34.2 |
| 9,031,801 | B2 * | 5/2015 | Sugaya | H02J 7/0047 702/63 |
| 9,201,119 | B2 * | 12/2015 | Baruzzi | G06F 15/00 |
| 9,857,429 | B2 * | 1/2018 | Daiss | H02J 7/0072 |
| 2005/0211488 | A1 * | 9/2005 | Gore | B62M 7/00 180/219 |
| 2009/0163317 | A1 * | 6/2009 | Goda | B60K 6/445 477/3 |
| 2010/0156425 | A1 * | 6/2010 | Ferre | G01R 31/389 324/430 |
| 2011/0266075 | A1 * | 11/2011 | Guzelinnian | B60K 16/00 180/2.2 |
| 2013/0278221 | A1 * | 10/2013 | Maeda | H01M 10/48 320/134 |
| 2014/0285135 | A1 * | 9/2014 | Ji | B60L 1/02 320/103 |
| 2014/0371983 | A1 * | 12/2014 | Miyashita | B60L 1/003 701/36 |
| 2018/0108956 | A1 * | 4/2018 | Fortenbacher | H01M 10/654 |
| 2019/0381861 | A1 * | 12/2019 | Maniann | B60H 1/00921 |

* cited by examiner

INFORMATION SUPPLY DEVICE, INFORMATION SUPPLY METHOD, AND STORAGE MEDIUM

CROSS-REFERENCE TO RELATED APPLICATION

Priority is claimed on Japanese Patent Application No. 2018-165956, filed Sep. 5, 2018, the content of which is incorporated herein by reference.

BACKGROUND

Field of the Invention

The present invention relates to an information supply device, an information supply method, and a storage medium.

Description of Related Art

In recent years, as environmental problems, energy problems, and the like have become serious, clean energy motor vehicles have gained attention for saving energy and handling exhaust gas problems. As one example, vehicles such as electric motor vehicles and hybrid vehicles (hereinafter simply referred to as electric motor vehicles) in which secondary cells supplying traveling power are mounted have gained attention because they produce no exhaust gas and have good energy efficiency. Batteries have important roles in electric motor vehicles and batteries equivalent to fuel meters of gasoline vehicles are necessary. Therefore, it is more important to accurately comprehend residual battery capacities or travelable distances during traveling.

In secondary cells used for electric motor vehicles, in general, performance deteriorates and travelable distances decrease with an increase in internal resistance at low temperatures. When residual battery capacities or travelable distances are calculated in states in which performance deteriorates at low temperatures, residual battery capacities or travelable distances lower than the original residual battery capacities or travelable distances due to low temperatures are calculated and are displayed on residual battery meters of meters. In this case, when a user (for example, a passenger or a driver of a vehicle) sees the residual battery capacity or travelable distance lower than the original residual battery capacity or travelable distance due to low temperatures displayed on the residual battery meter of the meter, there is concern of the user feeling uneasy about trouble or failure of the vehicle or battery.

The displayed decrease in the residual battery capacity or the travelable distance due to low temperatures is a temporary symptom. When traveling is actually started and the temperature of the secondary cell increases due to heat of an internal resistor generated with input and output of power or a dedicated heating device, the residual battery capacity or travelable distance returns to its original value.

With regard to the foregoing problem, in Tesla "Model S" according to an article of a news site described in TESLARATI, "Tesla Model S Cold Weather Battery Indicator Bar" URL:https://forums.teslarati.com/threads/tesla-model-s-cold-weather-battery-indicator-bar.665/, a "snow" mark is displayed and a message "Less energy is available due to cold battery" is displayed on a residual battery meter when the temperature of a secondary cell is low.

SUMMARY

However, according to the technology of TESLARATI, "Tesla Model S Cold Weather Battery Indicator Bar" <URL: https://forums.teslarati.com/threads/tesla-model-s-cold-weather-battery-indicator-bar.665/>, a decrease in a residual battery capacity due to low temperature is merely displayed and an impression of the decrease in the residual battery capacity on a passenger is not considered.

The present invention is devised in view of such circumstances and an object of the present invention is to provide an information supply device, an information supply method, and a storage medium capable of determining whether to notify a passenger of a decrease in a residual battery capacity in consideration of an impression on a passenger.

An information supply device, an information supply method, and a storage medium according to aspects of the present invention have the following configurations.

(1) According to an aspect of the present invention, there is provided an information supply device mounted in a vehicle that has a secondary cell supplying traveling power. The device includes: a temperature measurement unit configured to measure a temperature of the secondary cell; a storage management unit configured to store a first temperature of the secondary cell measured by the temperature measurement unit at a first timing before driving of the vehicle stops in a storage unit in association with the first timing; a residual capacity change derivation unit configured to derive a residual capacity change of the secondary cell between the first timing and a second timing at which the driving of the vehicle restarts based on a second temperature of the secondary cell measured by the temperature measurement unit at the second timing and the first temperature read from the storage unit; a display unit configured to display an image; and a display control unit configured to determine whether to cause the display unit to display a predetermined display based on the residual capacity change of the secondary cell derived by the residual capacity change derivation unit and a difference between the first timing and the second timing and to cause the display unit to perform the predetermined display in a case that the display control unit determines to cause the display unit to perform the predetermined display.

(2) In the information supply device in (1), the residual capacity change derivation unit may derive the residual capacity change with reference to a relation between a temperature change of the secondary cell and the residual capacity change of the secondary cell.

(3) In the information supply device in (1), the residual capacity change derivation unit may derive the residual capacity change with reference to a residual capacity change map in which a horizontal axis represents one of the first timing and the second timing and a vertical axis represents the other of the first timing and the second timing and in which a value of the residual capacity change associated with an intersection of the horizontal and vertical axes is defined.

(4) The information supply device in (1) may further include a travelable distance calculation unit configured to calculate a travelable distance change based on the derived residual capacity change and an average electric cost of the vehicle. The display control unit may determine whether to cause the display unit to perform the predetermined display based on a travelable distance change calculated by the travelable distance calculation unit.

(5) In the information supply device in (4), the travelable distance calculation unit may calculate the travelable distance change by multiplying the average electric cost of the vehicle by the derived residual capacity change.

(6) In the information supply device in (4), the display control unit may determine whether to cause the display unit to perform the predetermined display based on a notification determination curve generated based on a human forgetting ratio.

(7) In the information supply device in (4), the display control unit may determine not to cause the display unit to perform the predetermined display irrespective of the travelable distance change in a case that the difference between the first timing and the second timing is greater than a predetermined time.

(8) In the information supply device in (4), the predetermined display may be a display indicating that the travelable distance decreases due to a decrease in temperature.

(9) In the information supply device in (1), the display unit may be provided in the vehicle.

(10) In the information supply device in (1), the display unit may be provided in an information terminal designated in advance.

(11) According to another aspect of the present invention, there is provided an information supply method performed by a computer mounted in a vehicle that has a secondary cell supplying traveling power. The method includes: measuring a temperature of the secondary cell; storing a first temperature of the secondary cell measured at a first timing before driving of the vehicle stops in a storage unit in association with the first timing; deriving a residual capacity change of the secondary cell between the first timing and a second timing at which the driving of the vehicle restarts based on a second temperature of the secondary cell measured at the second timing and the read first temperature; and determining whether to cause a display unit to display a predetermined display based on the derived residual capacity change of the secondary cell and a difference between the first timing and the second timing and causing the display unit to perform the predetermined display in a case that it is determined to cause the display unit to perform the predetermined display.

(12) According to still another aspect of the present invention, there is provided a (computer-readable non-transitory) storage medium that stores a program and causes a computer mounted in a vehicle that has a secondary cell supplying traveling power to: measure a temperature of the secondary cell; store a first temperature of the secondary cell measured at a first timing before driving of the vehicle stops in a storage unit in association with the first timing; derive a residual capacity change of the secondary cell between the first timing and a second timing at which the driving of the vehicle restarts based on a second temperature of the secondary cell measured at the second timing and the read first temperature; and determine whether to cause a display unit to display a predetermined display based on the derived residual capacity change of the secondary cell and a difference between the first timing and the second timing and cause the display unit to perform the predetermined display in a case that it is determined to cause the display unit to perform the predetermined display.

According to the aspects of (1) to (12), it is possible to determine whether to notify of a decrease in a residual battery capacity in consideration of an impression on a passenger.

DESCRIPTION OF EMBODIMENTS

Hereinafter, embodiments of an information supply device, an information supply method, and a storage medium according to the present invention will be described with reference to the drawings. In the following description, a vehicle 10 is assumed to be an electric motor vehicle. The vehicle 10 may be a vehicle in which a secondary cell supplying traveling power is mounted or may be a hybrid motor vehicle or a fuel electric vehicle.

First Embodiment

First, a configuration of the vehicle 10 including an information supply device according to an embodiment of the present invention will be described.

[Vehicle 10]

Figure 1:
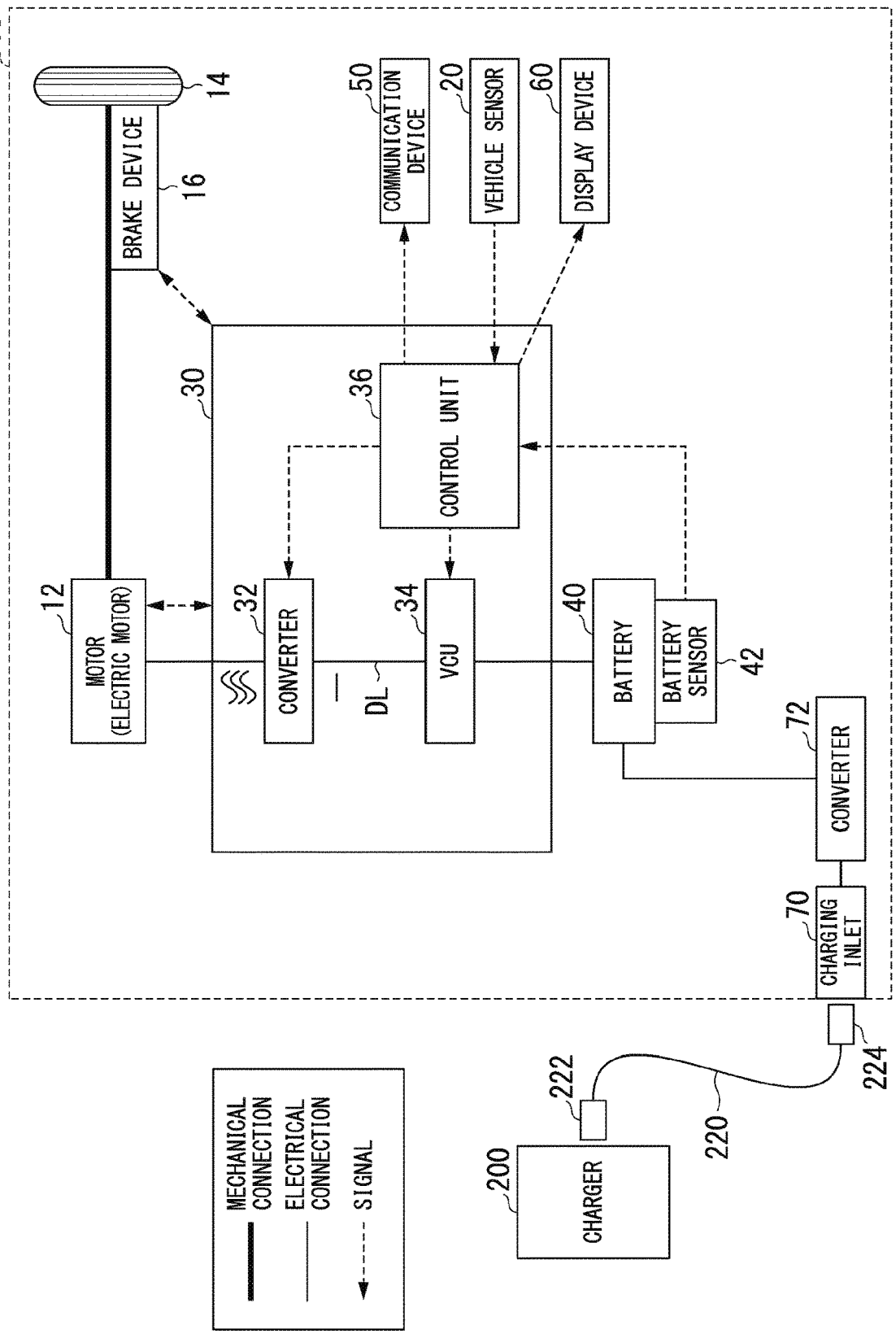
FIG. 1 is a diagram illustrating an example of a configuration of a vehicle.

FIG. 1 is a diagram illustrating an example of a configuration of the vehicle 10. As illustrated in FIG. 1, the vehicle 10 includes, for example, a motor 12, a driving wheel 14, a brake device 16, a vehicle sensor 20, a power control unit (PCU) 30, a battery (secondary cell) 40, a battery sensor 42 such as a voltage sensor, a current sensor, or a temperature sensor, a communication device 50, a display device 60, a charging inlet 70, and a converter 72.

The motor 12 is, for example, a three-phase alternating-current motor. A rotor of the motor 12 is connected to the driving wheel 14. The motor 12 outputs motive power to the driving wheel 14 using supplied power. The motor 12 generates power using kinetic energy of a vehicle when the vehicle decelerates.

The brake device 16 includes, for example, a brake caliper, a cylinder that transmits a hydraulic pressure to the brake caliper, and an electric motor that generates a hydraulic pressure in the cylinder. The brake device 16 may include a mechanism that transmits a hydraulic pressure generated through an operation of a brake pedal to the cylinder via a master cylinder, as a backup. The brake device 16 is not limited to the above-described configuration and may be an electronic control type hydraulic brake device that transmits a hydraulic pressure of the master cylinder to the cylinder.

The vehicle sensor 20 includes an acceleration opening sensor, a vehicle speed sensor, and a brake step amount sensor. The acceleration opening sensor is mounted in an accelerator pedal which is an example of an operator that receives an acceleration instruction from a driver, detects an operation amount of the accelerator pedal, and outputs the operation amount as an acceleration opening to the control unit 36 and the display device 60. The vehicle speed sensor includes, for example, a wheel speed sensor and a speed calculator mounted in each wheel, integrates wheel speeds detected by the wheel speed sensors to derive a speed of the vehicle (vehicle speed), and outputs the vehicle speed to the control unit 36 and the display device 60. The brake step amount sensor is mounted in the brake pedal, detects an operation amount of the brake pedal, and outputs the operation amount as a brake step amount to the control unit 36 and the display device 60.

The PCU 30 includes, for example, a converter 32, a voltage control unit (VCU) 34, and a control unit 36. A group of these constituent elements configured as the PCU 34 is merely exemplary and these constituent elements may be disposed in a distributed manner.

The converter 32 is, for example, an AC-DC converter. A direct-current side terminal of the converter 32 is connected to a direct-current link DL. The battery 40 is connected to the direct-current link DL via the VCU 34. The converter 32 converts an alternating current generated by the motor 12 into a direct current and outputs the direct current to the direct-current link DL.

The VCU 34 is, for example, a DC-DC converter. The VCU 34 boosts power supplied from the battery 40 and outputs the boosted power to the direct-current link DL.

The control unit 36 includes, for example, a motor control unit, a brake control unit, and a battery VCU control unit. The motor control unit, the brake control unit, and the battery VCU control unit of the control unit 36 may be substituted with separate control devices. The control unit 36 is substituted with, for example, control devices such as a motor ECU, a brake ECU, and a battery ECU.

The motor control unit of the control unit 36 controls the motor 12 based on an output of the vehicle sensor 20. The brake control unit of the control unit 36 controls the brake device 16 based on an output of the vehicle sensor 20. The battery VCU control unit of the control unit 36 calculates a state of charge (SOC) of the battery 40 based on an output of the battery sensor 42 mounted in the battery 40 and outputs the state of charge to the VCU 34. The VCU 34 increases a voltage of the direct-current link DL in response to an instruction from the battery VCU control unit of the control unit 36.

The battery 40 is, for example, a secondary cell such as a lithium-ion battery. The battery 40 stores power imported from an external charger 200 of the vehicle 10 and performs discharging to cause the vehicle 10 to travel. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, voltage value, temperature, and the like of the battery 40 to the control unit 36 and the communication device 50. The battery sensor 42 is an example of a "temperature measurement unit" in SUMMARY.

The communication device 50 includes a wireless module that connects to a cellular network or a Wi-Fi network. The communication device 50 communicates with a server or the like (not illustrated) via a network NW illustrated in FIG. 1.

Figure 2:
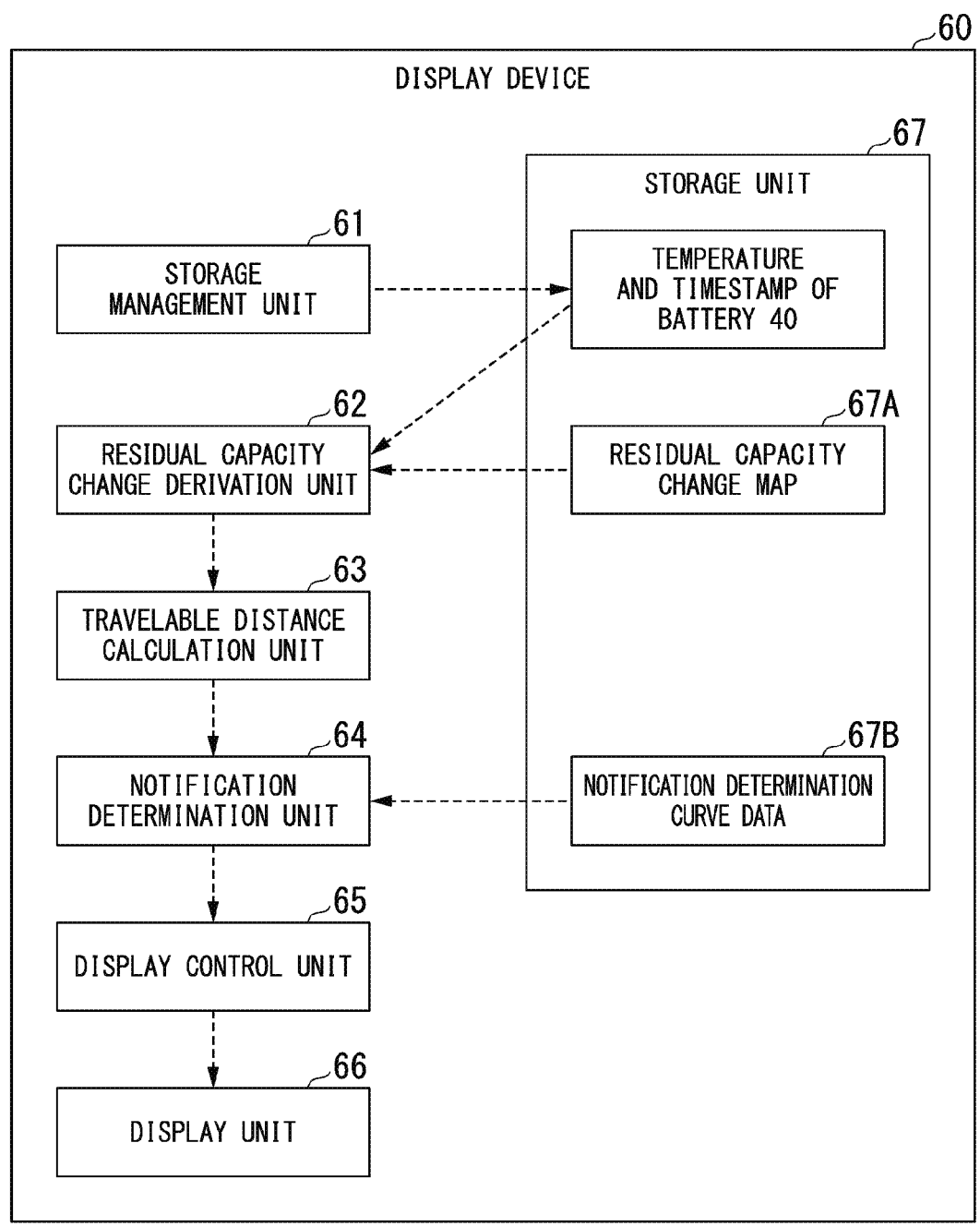
FIG. 2 is a diagram illustrating an example of a configuration of a display device.

FIG. 2 is a diagram illustrating an example of a configuration of the display device 60. The display device 60 includes, for example, a storage management unit 61, a residual capacity change derivation unit 62, a travelable distance calculation unit 63, a display control unit 65, a display unit 66, and a storage unit 67. The constituent elements other than the storage unit 67 are realized by, for example, a hardware processor such as a central processing unit (CPU) executing a program (software). Some or all of the constituent elements may be realized by hardware (circuit unit including circuitry) such as a large scale integration (LSI) circuit, an application specific integrated circuit (ASIC), a field-programmable gate array (FPGA), or a graphics processing unit (GPU) or may be realized by software and hardware in combination. The program may be stored in advance in a storage device (a storage device including a non-transitory storage medium) such as a hard disk drive (HDD) or a flash memory or may be stored in a detachably mounted storage medium (a non-transitory storage medium) such as a DVD or a CD-ROM to be installed when the storage medium is mounted in a drive device. For example, the storage unit 67 is realized by a storage device such as a hard disk drive (HDD) or a flash memory and data such as a residual capacity change map 67A and notification determination curve data 67B is stored.

A combination of the display device 60 and the battery sensor 42 is an example of an "information supply device." Some of the functions of the display device 60 such as the residual capacity change derivation unit 62 may be functions of the control unit 36. In this case, a combination of a part of the control unit 36, the display device 60, and the battery sensor 42 is an example of an "information supply device." A function of each functional unit will be described later.

The charging inlet 70 is provided toward the outside of the vehicle body of the vehicle 10. The charging inlet 70 is connected to the charger 200 via a charging cable 220. The charging cable 220 includes a first plug 222 and a second plug 224. The first plug 222 is connected to the charger 200 and the second plug 224 is connected to the charging inlet 70. Electricity supplied from the charger 200 is supplied to the charging inlet 70 via the charging cable 220.

The charging cable 220 includes a signal cable attached to a power cable. The signal cable relays communication between the vehicle 10 and the charger 200. Accordingly, each of the first plug 222 and the second plug 224 includes a power connector and a signal connector.

The converter 72 is provided between the battery 40 and the charging inlet 70. The converter 72 converts a current (for example, an alternating current) imported from the charger 200 via the charging inlet 70 into a direct current. The converter 72 outputs the converted direct current to the battery 40.

Figure 3:
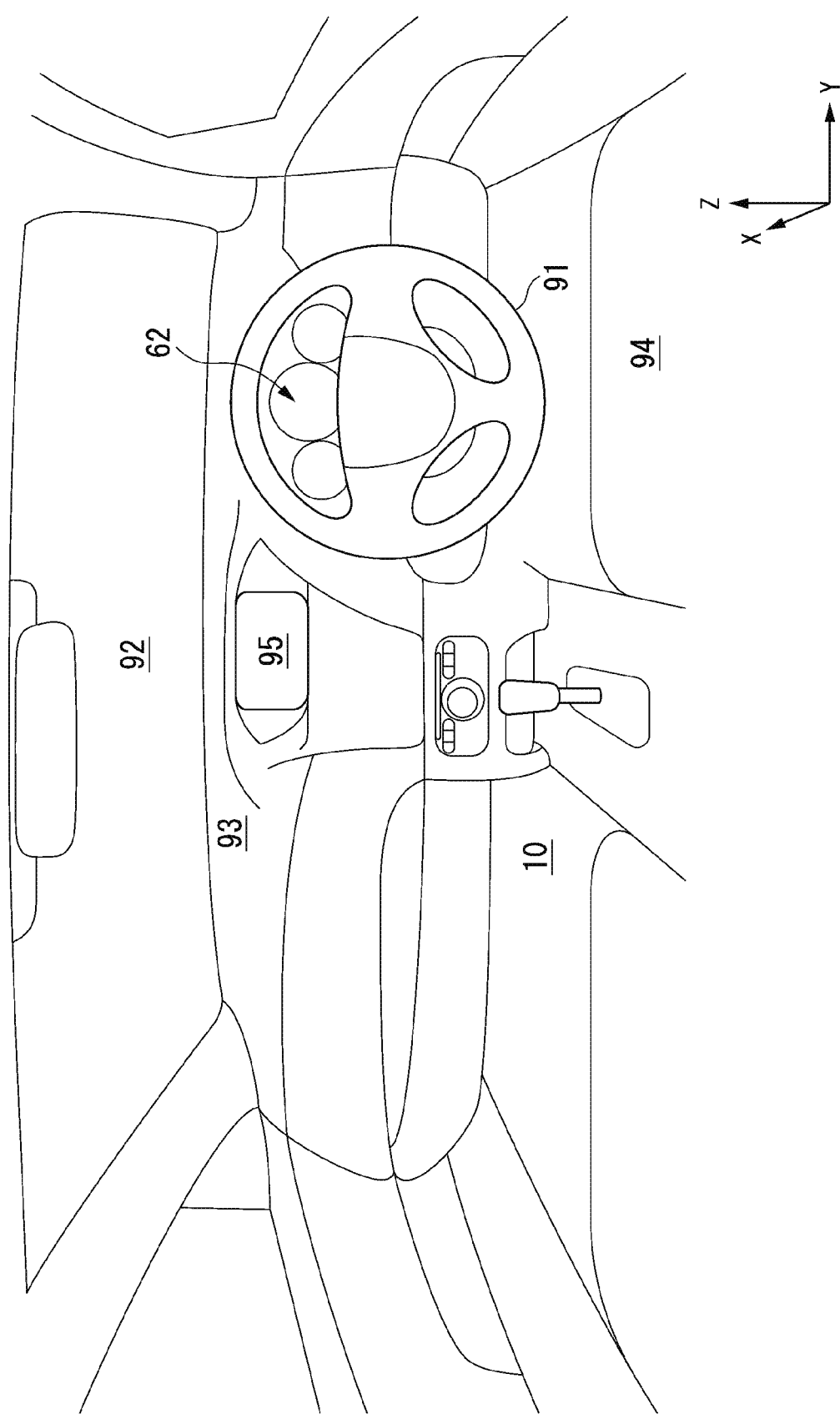
FIG. 3 is a diagram illustrating an example of a configuration of a vehicle interior of the vehicle.

FIG. 3 is a diagram illustrating an example of a configuration of a vehicle interior of the vehicle 10. As illustrated in FIG. 3, the vehicle 10 includes, for example, a steering wheel 91 controlling steering of the vehicle M, a front windshield 92 partitioning the outside and the inside of the vehicle, and an instrument panel 93. The front windshield 92 is a member that has a light transmission property.

The display unit 66 of the display device 60 is provided near the front side of a driver seat 94 in the instrument panel 93 inside the vehicle. The display unit 66 can be viewed from a gap in the steering wheel 91 or over the steering wheel 91 by a driver. A second display device 95 is provided in the middle of the instrument panel 93. The second display device 95 displays, for example, an image associated with a navigation process performed by a navigation device (not illustrated) mounted in the vehicle 10 or a video or the like of a partner with a videophone. The second display device 95 may display a television program, or display content such as a movie reproduced from a DVD or downloaded.

The display unit 66 of the display device 60 may be substituted with a display of an information terminal used by a driver. The information terminal is, for example, a smartphone, a tablet, a notebook PC, a game device, or the like. For example, when the information terminal used by the driver is positioned on the instrument panel 93 or a cradle installed near the instrument panel 93, the information terminal can perform display similarly to the display unit 66 provided in the instrument panel 93.

When the display unit 66 of the display device 60 is substituted with a display of the information terminal used by the driver, some of the functions of the display device 60 such as the residual capacity change derivation unit 62 may be realized by the information terminal. The functions of the display device 60 may be distributed and realized by a server (not illustrated) or the like communicating via the information terminal, the control unit 36, or the communication device 50. In this case, a combination of a part of the information terminal, a part of the control unit 36, the display device 60, a part of the server, and the battery sensor 42 is an example of an "information supply device."

[Configuration of Display Device 60]

Hereinafter, a function of each unit of the display device 60 will be described.

When the driving of the vehicle 10 stops (a first timing), the storage management unit 61 stores a temperature of the battery 40 (hereinafter referred to as a first temperature) measured by the battery sensor 42 functioning as a temperature measurement unit in the storage unit 67 in association with information such as a timestamp indicating a date and time of the first timing at that time. The storage management unit 61 may indirectly store the first timing separately in the storage unit 67 by storing the temperature of the battery 40 measured at intervals of a given time in the storage unit 67 in association with the timestamp including that day and time rather than directly recording the first temperature at the first timing.

When the driving of the vehicle 10 restarts (a second timing), the residual capacity change derivation unit 62 derives (measures) a residual capacity change of the battery 40 between a timing at which previous driving of the vehicle 10 stopped (a first timing) and a timing at which driving of the vehicle 10 restarts (the second timing) based on a temperature of the battery 40 measured by the battery sensor 42 functioning as a temperature measurement unit (hereinafter referred to as a second temperature) and a temperature read from the storage unit 67 (the first temperature). That is, how much a residual capacity of the battery 40 decreases during a period in which the driving of the vehicle 10 is stopped and the vehicle 10 is parked is derived based on the temperature of the battery 40 when the driving of the vehicle 10 stops (the first temperature) and the temperature of the battery 40 when the driving of the vehicle 10 restarts (the second temperature).

Figure 4:
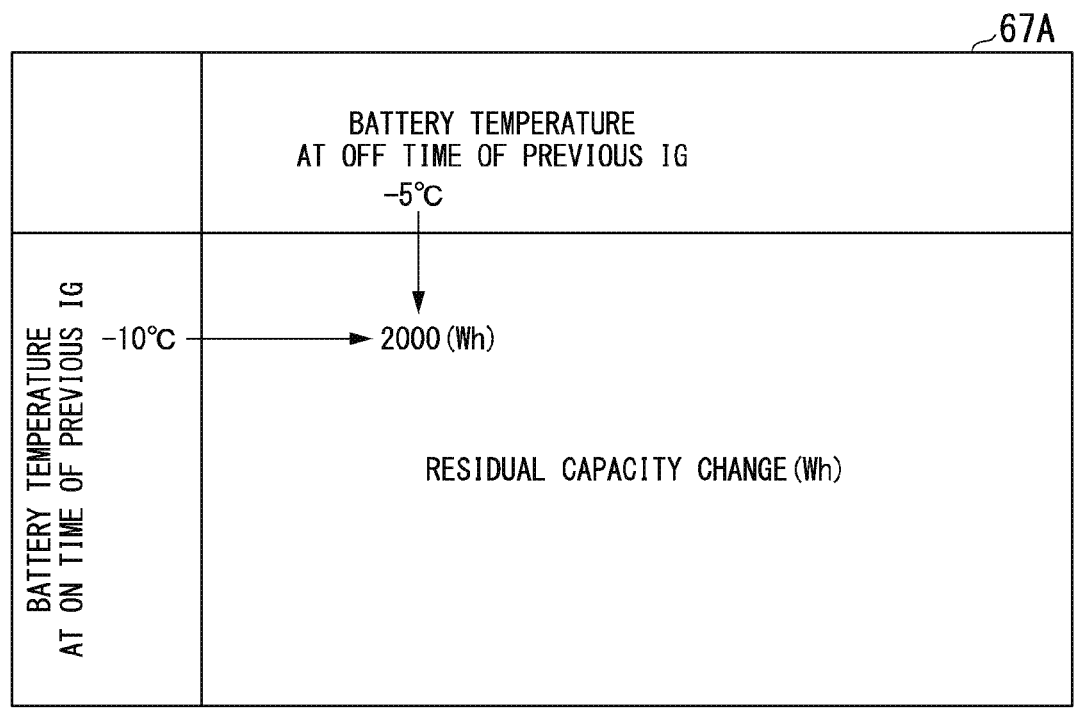
FIG. 4 is a diagram illustrating an example of a residual capacity change map.
Figure 5:
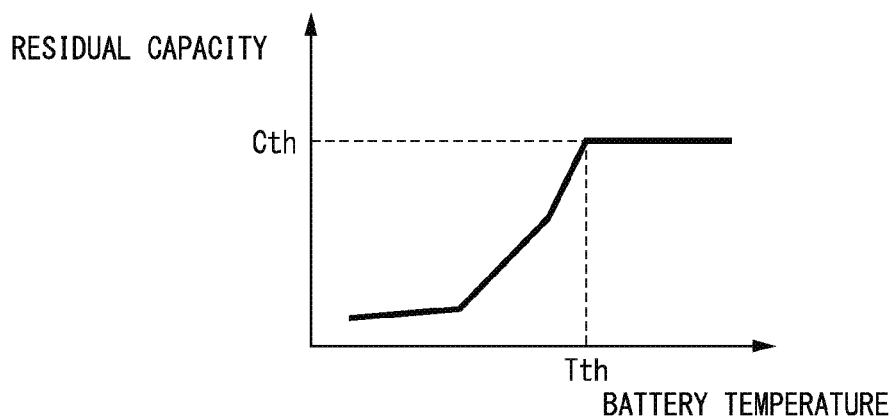
FIG. 5 is a diagram illustrating residual capacity change characteristics of a battery.

FIG. 4 is a diagram illustrating an example of a residual capacity change map. The residual capacity change derivation unit 62 derives a residual capacity change of the battery 40 by driving a residual capacity change associated with the temperature of the battery 40 measured by the battery sensor 42 at the first timing (the first temperature) and the temperature of the battery 40 measured by the battery sensor 42 at the second timing (the second temperature) from the residual capacity change map 67A illustrated in FIG. 4. FIG. 5 is a diagram illustrating residual capacity change characteristics of the battery 40 which is an origin of the residual capacity change map 67A illustrated in FIG. 4. As illustrated in FIG. 5, it is known that a residual capacity of a secondary cell (battery) used for an electric motor vehicle generally decreases due to an increase in internal resistance at low temperatures (for example, a given temperature Tth or less) as a temperature decreases.

The residual capacity change map 67A is a map in which the residual capacity change characteristics illustrated in FIG. 5 are developed with a 2-dimensional map format indicating a corresponding residual capacity change of the battery 40 in a combination of a temperature of the battery 40 at the first timing and a temperature of the battery 40 at the second timing. The residual capacity change map 67A is a map in which a temperature of the battery 40 at the first timing is applied to the horizontal axis and a temperature of the battery 40 at the second timing is applied to the vertical axis. A residual capacity change [Wh] of the battery 40 is defined at an intersection of the temperatures. For example, when a temperature of the battery 40 at the first timing is −5 [° C.] and a temperature of the battery 40 at the second timing is −10 [° C.], the residual capacity change derivation unit 62 derives 2000 [Wh] as a residual capacity change of the battery 40 from the residual capacity change map 67A.

The "residual capacity change of the battery 40" is a change in power remaining in the battery 40. The power remaining in the battery 40 is obtained in accordance with, for example, Expression (1) below. In Expression (1), C indicates a residual capacity [Wh], SoC indicates a charging ratio [%], and Cmax indicates a full charge capacity [Wh]. In Expression (1), SoC and Cmax can be obtained by acquiring and integrating charge and discharge currents or the like of the battery 40 by the battery sensor 42 in accordance with a known calculation method.

$$C[\text{Wh}]=SoC[\%] \times C\text{max [Wh]} \tag{1}$$

The "residual capacity change of the battery 40" is a difference between a residual capacity $C_1$ [Wh] at the first timing and a residual capacity $C_2$ [Wh] at the second timing, that is, $\Delta C = C_1 - C_2$.

The residual capacity change derivation unit 62 may use an approximation function in which each temperature is input as a parameter, a residual capacity change is approximated mathematically, and the approximated residual capacity change is output, instead of the residual capacity change map 67A. In this case, the residual capacity change derivation unit 62 can simplify a derivation process.

The residual capacity change derivation unit 62 may select the residual capacity change map 67A appropriately to correspond to the residual capacity of the battery 40 derived in accordance with a method which is not mentioned in the embodiment or may perform calculation to correct a residual capacity obtained from the residual capacity change map 67A in accordance with the residual capacity of the battery 40.

The characteristics of a temperature and a usable capacity illustrated in FIG. 5 or the residual capacity change map 67A illustrated in FIG. 4 may be generated on the basis of data supplied from a battery manufacturer or may be acquired by an experiment or the like when the vehicle 10 is manufactured. The residual capacity change derivation unit 62 may appropriately derive and correct information associated with the characteristics of the temperature and the usable capacity illustrated in FIG. 5 or the residual capacity change map 67A illustrated in FIG. 4 based on the information such as the charge and discharge currents of the battery 40 acquired by the battery sensor 42 during driving of the vehicle 10. The residual capacity change map 67A may be generated based on a result obtained by transmitting the charge and discharge currents or the like of the battery 40 acquired by the battery sensor 42 to an external server via the communication device 50 and processing data of many vehicles 10 in the external server. In this case, it is possible to realize generation of the residual capacity change map 67A with higher precision based on the data of the many vehicles 10.

The travelable distance calculation unit 63 calculates a travelable distance change, for example, by acquiring an average electric cost of the vehicle 10 obtained in advance, as indicated in Expression (2) and multiplying the acquired average electric cost by the residual capacity change derived by the residual capacity change derivation unit 62. In Expression (2), ΔC indicates a residual capacity change derived by the residual capacity change derivation unit 62, ΔX indicates a travelable distance change, and Acost indicates an average electric cost.

$$\Delta X[\text{km}] = A\text{cost }[\text{km/Wh}] \times \Delta C[\text{Wh}] \quad (2)$$

For example, when the average electric cost of the vehicle 10 is 9.0 [km/kWh] and the residual capacity change derived by the residual capacity change derivation unit 62 is 5.5 [kWh], it is possible to obtain a result in which a travel distance of 49.5 [km] decreases in accordance with Expression (2).

Based on the residual capacity change derived by the residual capacity change derivation unit 62 and a temporal difference between the time at which the previous driving of the vehicle 10 stops (the first timing) and the time at which the driving of the vehicle 10 restarts subsequently (the second timing), the display control unit 65 determines whether to perform notification by causing the display unit 66 to perform a predetermined display. Based on the travelable distance change calculated by the travelable distance calculation unit 63 by multiplying the average electric cost of the vehicle 10 by the residual capacity change and the length of a time in which the driving of the vehicle 10 is stopped and the vehicle 10 is parked (that is, a temporal difference between the first timing and the second timing), the display control unit 65 determines whether to perform notification for a driver by causing the display unit 66 to display a predetermined display with reference to the notification determination curve data 67B to be described below.

[Determination Method by Display Control Unit 65]

Figure 6:
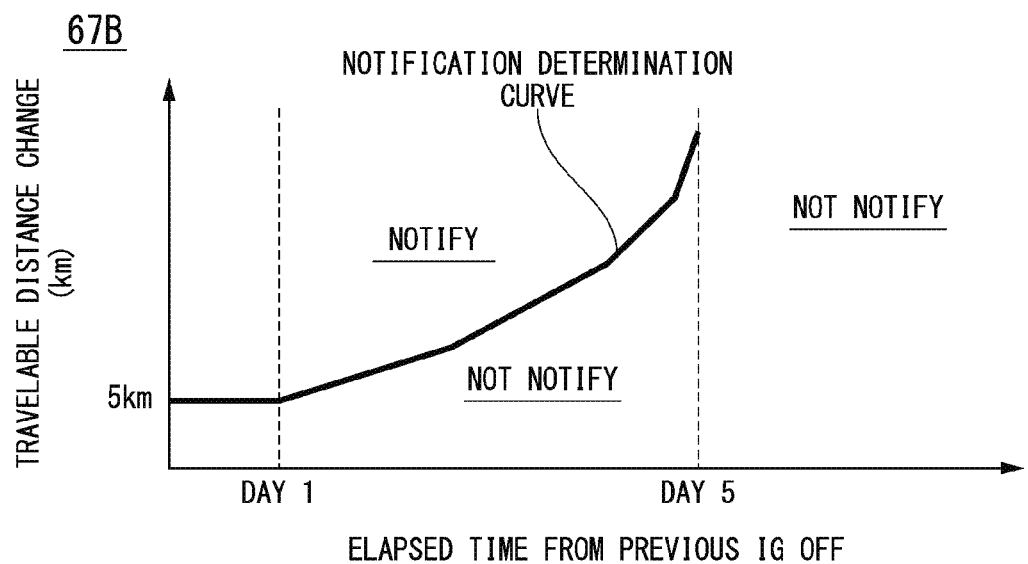
FIG. 6 is a diagram illustrating an example of a notification determination curve.

Based on the travelable distance change calculated by the travelable distance calculation unit 63 and the length of a time in which the driving of the vehicle 10 stops and the vehicle 10 is parked (that is, the temporal difference between the first timing and the second timing), the display control unit 65 determines whether to perform notification for a driver by causing the display unit 66 to display a predetermined display with reference to the notification determination curve data 67B illustrated in FIG. 6. FIG. 6 is a diagram illustrating an example of content of the notification determination curve data 67B.

In the notification determination curve data 67B, as illustrated in FIG. 6, the horizontal axis represents an elapsed time from the first timing and the vertical axis represents the travelable distance change calculated by the travelable distance calculation unit 63. A rule is decided for determining whether to notify a driver of a decrease in a travelable distance depending on a side on which given coordinates are located between illustrated "notify" and "not notify" with reference to a notification determination curve defined on a plane formed by the horizontal and vertical axes. The display control unit 65 performs notification for the driver when coordinates which can be defined in a combination of the elapsed time from the first timing and the travelable distance change calculated by the travelable distance calculation unit 63 are located above the notification determination curve on the plane indicated by the notification determination curve data 67B ("notify" in the drawing). The display control unit 65 does not perform notification for the driver when coordinates which can be defined in a combination of the elapsed time from the first timing and the travelable distance change calculated by the travelable distance calculation unit 63 are located below the notification determination curve on the plane indicated by the notification determination curve data 67B ("not notify" in the drawing). The notification determination curve data 67B is generated based on the knowledge that sensitivity to the travelable distance change decreases as the elapsed time from the first timing is longer in consideration of a forgetting ratio of a human memory.

When a time for which the vehicle 10 is parked is a short time (for example, about 2 to 3 hours), a driver is highly likely to clearly remember a travelable distance displayed on a meter at the time at which the previous driving of the vehicle 10 stopped. Therefore, even when the travelable distance change is small, the display control unit 65 causes the display device 60 to easily display that a decrease in the travelable distance occurs due to a low temperature. For example, when a parking time is a short time, a driver is highly likely to clearly remember that "travelable distance of 50 miles" is displayed before parking of the vehicle 10. When a driver enters the vehicle 10 a short time after parking and a decrease in a travelable distance such as "travelable distance of 40 miles" is displayed, the driver is likely to feel uneasy about trouble or failure of the battery 40. Accordingly, when the vehicle 10 is parked for a short time, the display control unit 65 notifies the display device 60 that, despite a small travelable distance a decrease in a travelable distance occurs due to a low temperature.

In contrast, when a time for which the vehicle 10 is parked is a long time (for example, about 3 to 4 [days]), a driver is highly likely not to clearly remember a travelable distance displayed on a meter at the time at which the previous driving of the vehicle 10 stopped. Therefore, the display control unit 65 causes the display device 60 to hardly display the fact that a decrease in the travelable distance occurs due to a low temperature unless the travelable distance change is large. This is because when a parking time is about 3 to 4 [days], a driver is less likely to worry about a slight travelable distance change unless the travelable distance change is considerably large. Accordingly, when the vehicle 10 is parked for a long time, the display control unit 65 does not display occurrence of a decrease in the travelable distance due to low temperature on the display device 60 unless the travelable distance change is large.

When a parking time is a short time from previous boarding, a driver is highly likely to clearly remember a travelable distance from the time of end of the previous driving. Therefore, when the travelable distance is changed during parking, notification is necessary. In contrast, when a parking time is a long time, a driver is highly likely to forget a travelable distance from the time of end of the previous driving. Therefore, it is less necessary to notify of a change in the travelable distance in some cases.

Therefore, the display control unit 65 determines whether to perform notification for a driver with reference to the notification determination curve data 67B based on a difference between the first timing and the second timing. The notification determination curve data 67B used for the determination may be changed based on an instruction from the driver or may be automatically changed based on a driving history of the driver. The "change" is a change in the notification determination curve of the notification determination curve data 67B toward a side on which the notification for the driver is more or less likely. The change toward the side on which the notification is more likely is downward or rightward movement of the notification determination curve of the notification determination curve data 67B illustrated in FIG. 6. The change toward the side on which the notification is less likely is upward or leftward movement of the notification determination curve of the notification determination curve data 67B illustrated in FIG. 6.

When the parking time is equal to or greater than a given time, as illustrated in FIG. 6 (when the elapsed time is equal to or greater than the given time; DAY 5 in the example of FIG. 6), the display control unit 65 does not notify the driver that a decrease in the travelable distance due to a low temperature occurs irrespective of the travelable distance change. This is because when the parking time is equal to or greater than the given time, battery deterioration, self-discharge, or the like occurs due to a long time of neglect even without temperature change, and thus it is not necessary to "notify the driver of occurrence of the decrease in the travelable distance due to a low temperature."

The display control unit 65 may perform the notification determination using an approximation function that approximates the notification determination curve data 67B mathematically instead of the notification determination curve data 67B.

[Process Flow]

Figure 7:
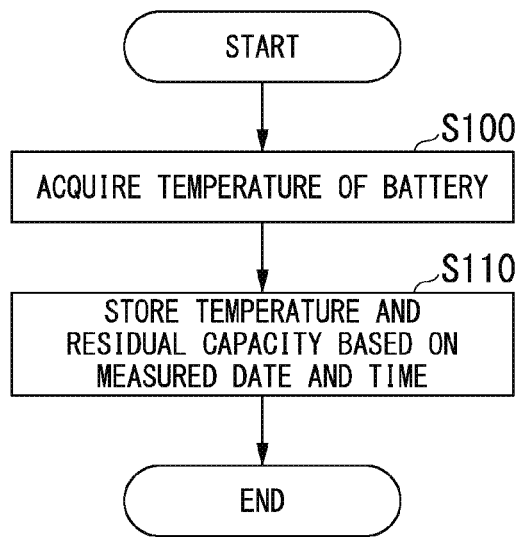
FIG. 7 is a flowchart illustrating an example of a flow of a process performed by the display device.

Next, a flow of a process performed in the display device 60 will be described with reference to the flowchart. FIG. 7 is a flowchart illustrating an example of a flow of a process performed by the display device 60. The process of the flowchart is performed when driving of the vehicle 10 stops (for example, at an ignition-OFF timing).

The storage management unit 61 acquires the temperature of the battery 40 from the battery sensor 42 functioning as a temperature measurement unit (step S100). Then, the storage management unit 61 stores the acquired temperature of the battery 40 (the first temperature) and the information such as the timestamp indicating that date and time (the first timing) in the storage unit 67 (step S110). In this way, the process of the flowchart of FIG. 7 ends.

Figure 8:
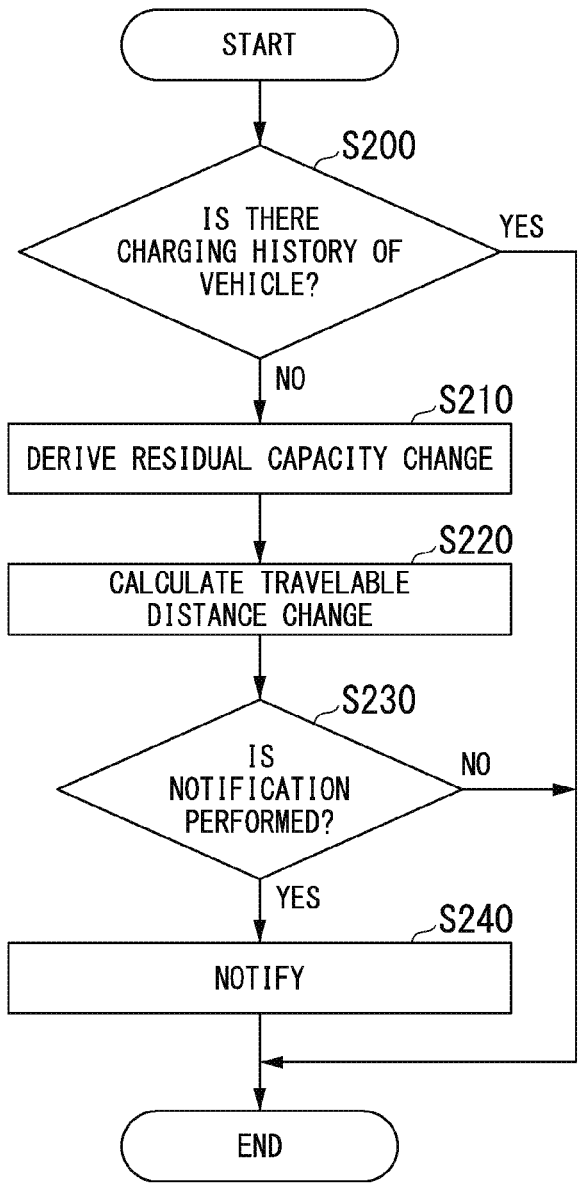
FIG. 8 is a flowchart illustrating an example of a flow of a process performed by the display device.

FIG. 8 is a flowchart illustrating an example of a flow of a process performed by the display device 60. The process of the flowchart is performed when driving of the vehicle 10 restarts (for example, at an ignition-ON timing).

The display device 60 first determines whether there is a charging history of the vehicle 10 after the first timing (step S200). When the display device 60 determines in step S200 that there is the charging history of the vehicle 10 after the first timing, the display device 60 ends the process of the flowchart of FIG. 8.

When the display device 60 determines in step S200 that there is no charging history of the vehicle 10 after the first timing, the residual capacity change derivation unit 62 derives the residual capacity change of the battery 40 with reference to the residual capacity change map 67A based on the current temperature of the battery 40 measured by the battery sensor 42 (the second temperature) and the temperature read from the storage unit 67 (the first temperature) (step S210).

Subsequently, the travelable distance calculation unit 63 calculates the travelable distance change by multiplying the residual capacity change of the battery 40 obtained in step S210 by the average electric cost of the vehicle 10 (step S220).

Subsequently, the display control unit 65 determines whether the display unit 66 is caused to perform the predetermined display and perform the notification with reference to notification determination curve data 67B based on the travelable distance change calculated by the travelable distance calculation unit 63 in step S220 and the length of a time in which driving of the vehicle 10 stops and the vehicle 10 is parked (the difference between the first timing and the second timing) (step S230).

When it is determined in step S230 that the notification is performed, the display control unit 65 performs the notification by causing the display unit 66 performing the predetermined display (step S240).

When it is determined in step S230 that the notification is not performed, the display device 60 ends the process of the flowchart.

An execution order of the steps in the information supply method according to the embodiment is not limited to the described order of the steps. For example, the processes of steps S210 and S220 may be performed in any order.

The modes for carrying out the present invention have been described above according to the embodiments, but the present invention is not limited to the embodiments and various modifications and substitutions can be made within the scope of the present invention without departing from the gist of the present invention.

For example, in the foregoing embodiment, the example in which the temperature of the battery 40 and the measurement date and time (the timestamp), the residual capacity change map 67A, and the notification determination curve data 67B are stored in the storage unit 67 mounted in the vehicle 10 has been described. An embodiment of the present invention is not limited to this mode and the temperature of the battery 40 and the measurement date and time (the timestamp), the residual capacity change map 67A, and the notification determination curve data 67B may be stored in a server and may be acquired by the communication device 50 via a network. They may be recorded on a removable medium and may be appropriately read from the removable medium.

When the battery sensor 42 functioning as a temperature measurement unit measures a temperature of the battery 40, the battery sensor 42 may measure a temperature of each of a plurality of cells included in the battery 40 and store the temperature of each cell measured by the storage management unit 61 in the storage unit 67. In this case, the residual capacity change derivation unit 62 may calculate a residual capacity change for each cell based on the temperature of each cell included in the battery 40 stored in the storage unit 67. In this case, the travelable distance calculation unit 63 may calculate a sum value of the travelable distance change associated with the residual capacity change of each cell included in the battery 40 as the entire travelable distance change of the vehicle 10.

The battery sensor 42 functioning as the temperature measurement unit may measure a temperature of each of the plurality of cells included in the battery 40 and store an average value of the temperatures of the cells measured by the storage management unit 61 in the storage unit 67 when the temperature of the battery 40 is measured. When the storage management unit 61 calculates the average value, a method of calculating a weight average (weighted mean) obtained by performing predetermined weighting for each cell included in the battery 40 may be adopted.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information supply device mounted in a vehicle that has a secondary cell supplying traveling power, the device comprising:
   a temperature measurement unit configured to measure a temperature of the secondary cell;
   a storage management unit configured to store a first temperature of the secondary cell measured by the temperature measurement unit at a first timing before driving of the vehicle stops in a storage unit in association with the first timing;
   a residual capacity change derivation unit configured to derive a residual capacity change of the secondary cell between the first timing and a second timing at which the driving of the vehicle restarts based on a second temperature of the secondary cell measured by the temperature measurement unit at the second timing and the first temperature read from the storage unit;
   a display unit configured to display an image; and
   a display control unit configured to determine whether to cause the display unit to display a predetermined display based on the residual capacity change of the secondary cell derived by the residual capacity change derivation unit and a difference between the first timing and the second timing and to cause the display unit to perform the predetermined display in a case that the display control unit determines to cause the display unit to perform the predetermined display.

2. The information supply device according to claim 1, wherein the residual capacity change derivation unit derives the residual capacity change with reference to a relation between a temperature change of the secondary cell and the residual capacity change of the secondary cell.

3. The information supply device according to claim 1, wherein the residual capacity change derivation unit derives the residual capacity change with reference to a residual capacity change map in which a horizontal axis represents one of the first timing and the second timing and a vertical axis represents the other of the first timing and the second timing and in which a value of the residual capacity change associated with an intersection of the horizontal and vertical axes is defined.

4. The information supply device according to claim 1, further comprising:
   a travelable distance calculation unit configured to calculate a travelable distance change based on the derived residual capacity change and an average electric cost of the vehicle,
   wherein the display control unit determines whether to cause the display unit to perform the predetermined display based on a travelable distance change calculated by the travelable distance calculation unit.

5. The information supply device according to claim 4, wherein the travelable distance calculation unit calculates the travelable distance change by multiplying the average electric cost of the vehicle by the derived residual capacity change.

6. The information supply device according to claim 4, wherein the display control unit determines whether to cause the display unit to perform the predetermined display based on a notification determination curve generated based on a human forgetting ratio.

7. The information supply device according to claim 4, wherein the display control unit determines not to cause the display unit to perform the predetermined display irrespective of the travelable distance change in a case that the difference between the first timing and the second timing is greater than a predetermined time.

8. The information supply device according to claim 1, wherein the predetermined display is a display indicating that the travelable distance decreases due to a decrease in temperature.

9. The information supply device according to claim 1, wherein the display unit is provided in the vehicle.

10. The information supply device according to claim 1, wherein the display unit is provided in an information terminal designated in advance.

11. An information supply method performed by a computer mounted in a vehicle that has a secondary cell supplying traveling power, the method comprising:
    measuring a temperature of the secondary cell;
    storing a first temperature of the secondary cell measured at a first timing before driving of the vehicle stops in a storage unit in association with the first timing;
    deriving a residual capacity change of the secondary cell between the first timing and a second timing at which the driving of the vehicle restarts based on a second temperature of the secondary cell measured at the second timing and the read first temperature; and
    determining whether to cause a display unit to display a predetermined display based on the derived residual capacity change of the secondary cell and a difference between the first timing and the second timing and causing the display unit to perform the predetermined display in a case that it is determined to cause the display unit to perform the predetermined display.

12. A computer-readable non-transitory storage medium that stores a program and causes a computer mounted in a vehicle that has a secondary cell supplying traveling power to:
    measure a temperature of the secondary cell;
    store a first temperature of the secondary cell measured at a first timing before driving of the vehicle stops in a storage unit in association with the first timing;
    derive a residual capacity change of the secondary cell between the first timing and a second timing at which the driving of the vehicle restarts based on a second temperature of the secondary cell measured at the second timing and the read first temperature; and
    determine whether to cause a display unit to display a predetermined display based on the derived residual capacity change of the secondary cell and a difference between the first timing and the second timing and cause the display unit to perform the predetermined display in a case that it is determined to cause the display unit to perform the predetermined display.

* * * * *